United States Patent [19]
Weidinger et al.

[11] Patent Number: 5,667,049
[45] Date of Patent: Sep. 16, 1997

[54] PULLED-TYPE MEMBRANE SPRING CLUTCH WITH WEAR ADJUSTMENT MECHANISM

[75] Inventors: Reinhold Weidinger, Unterspiesheim; Jörg Sudau, Niederwerrn, both of Germany

[73] Assignee: Fichtel & Sachs AG, Schweinfurt, Germany

[21] Appl. No.: 541,829

[22] Filed: Oct. 10, 1995

[30] Foreign Application Priority Data

Oct. 10, 1994 [DE] Germany ............ 44 36 110.6

[51] Int. Cl.$^6$ .................................................. F16D 13/75
[52] U.S. Cl. ........................ 192/70.25; 192/89.24; 192/111 A
[58] Field of Search .............. 192/70.25, 111 A, 192/89.23, 89.24

[56] References Cited

U.S. PATENT DOCUMENTS

| | | |
|---|---|---|
| 4,640,400 | 2/1987 | Nakane et al. ............ 192/70.25 |
| 5,029,687 | 7/1991 | Asada et al. . |
| 5,069,322 | 12/1991 | Mizukami et al. . |
| 5,123,512 | 6/1992 | Nemoto et al. ............ 192/70.25 |
| 5,377,803 | 1/1995 | Link et al. . |
| 5,400,887 | 3/1995 | Mizukami et al. ......... 192/109 A X |
| 5,404,979 | 4/1995 | Craft et al. .............. 192/70.25 |
| 5,409,091 | 4/1995 | Reik et al. ............... 192/70.25 |
| 5,513,735 | 5/1996 | Uenohara .............. 192/70.25 X |

FOREIGN PATENT DOCUMENTS

| | | |
|---|---|---|
| 4306688 | 11/1993 | Germany . |
| 4322677 | 1/1994 | Germany . |
| 4342390 | 6/1994 | Germany . |
| 4337613 | 5/1995 | Germany . |

*Primary Examiner*—Rodney H. Bonck
*Attorney, Agent, or Firm*—Nils H. Ljungman and Associates

[57] ABSTRACT

A pulled membrane spring clutch, whereby the membrane spring is supported with its outside diameter on a plate spring, which membrane spring has a rather large load pressure. The resulting load pressure acts on a mechanism which makes an automatic adjustment to compensate for wear to the friction linings, whereby the membrane spring retains its position relative to the clutch housing.

8 Claims, 4 Drawing Sheets

PULLED-TYPE MEMBRANE SPRING CLUTCH WITH WEAR ADJUSTMENT MECHANISM

BACKGROUND OF THE INVENTION

1. Field of the Invention

The present invention generally relates to a membrane spring clutch of the pulled type, which clutch includes a clutch housing. The clutch housing is fastened to a flywheel, which flywheel has a friction surface to rotate with the flywheel around an axis of rotation. The clutch has an application plate, which application plate is mounted in the clutch housing non-rotationally, but so that it can move axially. There is also a clutch plate between the application plate and the flywheel, which clutch plate includes friction linings. The clutch further includes a membrane spring to generate the application force. The membrane spring is braced with its outside diameter on the clutch housing, and an intermediate diameter of the membrane spring is on the application plate. The membrane spring has flexible tabs pointing radially inward for engaging a clutch disengagement system. The clutch also has a mechanism to make an automatic adjustment for wear of the friction linings.

2. Background Information

A membrane spring clutch of the type described above is disclosed, for example, in German Patent Application P 43 06 688.

OBJECT OF THE INVENTION

The object of the present invention is to create a membrane spring clutch which can be manufactured more economically than similar known devices.

SUMMARY OF THE INVENTION

The present invention teaches that this object can be accomplished by advantageously providing support for the membrane spring on the clutch housing, on the side of the membrane spring facing away from the application plate, by means of a plate spring, which plate spring can be realized in the form of an abutment. In addition, in the same diameter area, on the side of the membrane spring facing the application plate, between the membrane spring and a component firmly affixed to the clutch housing, there is preferably a mechanism, which mechanism can make an automatic adjustment to compensate for wear of the friction linings. The mechanism can operate by means of a force-dependent adjustment, or, by retaining the original position of the membrane spring. The load pressures or tracking forces of the membrane spring can thereby increase as wear occurs.

In accordance with the present invention, when wear occurs, and thus the force of the membrane spring increases, the mechanism for the automatic compensation of wear of the friction linings can make an adjustment, which adjustment can essentially guarantee that the membrane spring, as a whole, can be displaced parallel to the wear. Thus, the membrane spring can retain its relative position. At the same time, it can essentially be guaranteed that the load pressures produced by the membrane spring, which load pressures can generate the application forces, can be kept essentially constant. This type of compensation for wear can be particularly advantageous when the clutch in question is of the "pulled" design, because on a pulled-type clutch, the flexible tabs, which flexible tabs can point radially inward, would be required to execute a particularly large pivoting motion if there were no mechanism to compensate for wear. As a result of such a mechanism, the disengagement system need not be designed to accommodate an excessive disengagement movement, which excessive disengagement movement would typically require a relatively large amount of space.

The present invention also teaches that the mechanism for the automatic compensation of wear on the friction linings can include at least one ring-shaped component, which ring-shaped component can be oriented concentric to the axis of rotation. On the circumference of the ring-shaped component, there can be partial surfaces, which partial surfaces can result in an ascending gradient. The partial surfaces can interact with corresponding surfaces on the ring-shaped component, which corresponding surfaces of the ring-shaped component can preferably be firmly affixed to the clutch housing. A spring mechanism can thereby apply pressure to the ring-shaped component, in the direction of the clutch housing, in the sense of reducing the axial distance. As a result of the use of these simple components, and the action of the wear compensation mechanism in a force-dependent manner, it can be possible to achieve an essentially simple, automatic compensation for wear, whereby the magnitude of the disengagement movement can essentially have no effect on the action of the wear compensation mechanism.

The present invention also teaches that it is advantageous for the ring-shaped component to be acted upon by the differential force of the plate spring and membrane spring, in the sense of reducing the axial distance. The use of a plate spring can thereby be particularly advantageous, because the plate spring can be designed such that the plate spring can have an relatively flat spring characteristic. Thus the plate spring can change its application force essentially only insignificantly over the wear distance.

When the word invention is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and in the event that there is more than one invention, that these inventions may be patentable and non-obvious one with respect to the other.

One aspect of the invention resides broadly in a friction clutch for a motor vehicle with automatic compensation for wear, the friction clutch comprising: a clutch housing; a clutch disc for being disposed on a transmission input shaft having a longitudinal axis, the clutch disc being axially movable along the transmission input shaft; pressure plate means for engaging and disengaging the clutch disc with a flywheel, the pressure plate means being axially movable along the transmission input shaft; the clutch disc comprising: friction lining means disposed between the pressure plate means and the flywheel for contacting the flywheel and the pressure plate means upon engagement of the clutch disc; membrane spring means disposed between the clutch housing and the pressure plate means for applying pressure to the pressure plate means and for biasing the pressure plate means towards the flywheel; wear compensation means; means for operatively connecting the wear compensation means to a first portion of the clutch housing; and means for supporting the membrane spring means on a second portion of the clutch housing.

BRIEF DESCRIPTION OF THE DRAWINGS

The present invention is explained in greater detail below with reference to the accompanying drawings, in which.

DESCRIPTION OF THE PREFERRED EMBODIMENT

The membrane spring clutch 1, with its clutch housing 2, can be fastened to a flywheel (not shown here but see FIG. 1') of an internal combustion engine, which flywheel can revolve around the axis of rotation 3. In the clutch housing 2 there can be an application plate or pressure plate 4. The application plate 4 can be attached non-rotationally to the clutch housing 2, but in such a manner that the application plate 4 can be displaced axially. The fastening of the application plate 4 can be achieved, for example, by means of conventional tangential leaf springs. A membrane spring 7 can be located between the clutch housing 2 and the application plate 4, such that the membrane spring 7 can be supported, on an intermediate diameter, on the application plate 4. Thus, the membrane spring 7 can generate an application force $F_A$.

Figure 1:
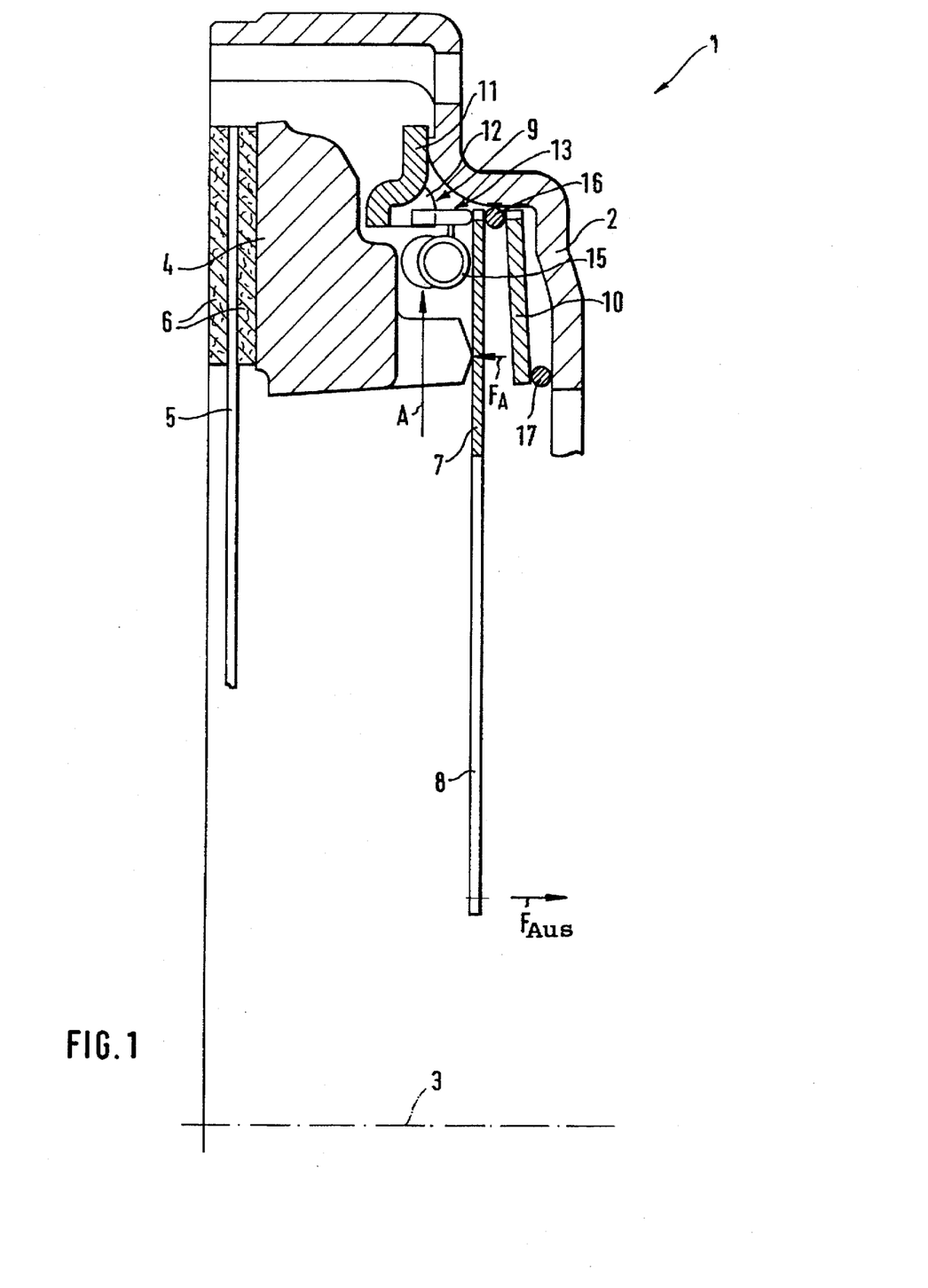
FIG. 1 shows the upper half of a longitudinal section through a membrane spring clutch.

In accordance with one embodiment, the membrane spring 7 can preferably have a number of flexible tabs 8, which flexible tabs 8 can extend inwardly toward the axis of rotation 3. In addition, the friction clutch 1 can also include a clutch disc 5, which clutch disc 5 can preferably have friction linings 6 for engaging with the flywheel and application plate 4.

Figure 1A:
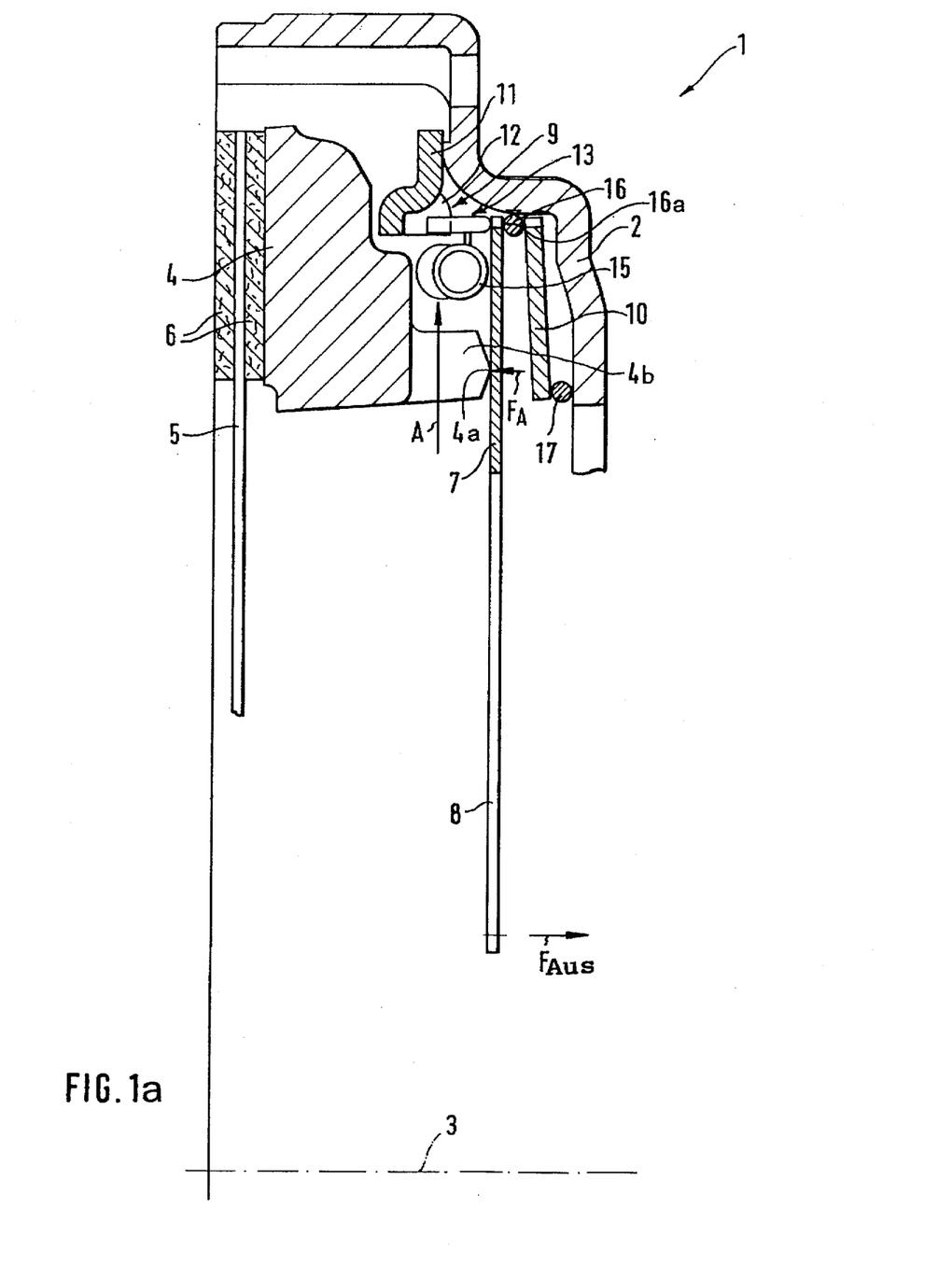
FIG. 1a shows the same view as FIG. 1, but with additional components.

In accordance with an embodiment of the present invention, the application plate 4 can include an extended portion 4b (see FIG. 1a), which extended portion 4b can be located radially inside a ring-shaped component 13. The extended portion 4b of the application plate 4 can have a contact point 4a, as shown in FIG. 1a, which contact point 4a can face toward the membrane spring 7 to provide a contact surface for the membrane spring 7, so that the membrane spring 7 can cause the application plate 4 to engage the clutch disc 5.

The membrane spring 7 can also be indirectly supported, by means of its outside diameter, on the clutch housing 2 with essentially the same force, in the opposite direction. The indirect support of the membrane spring 7 can be provided by a plate spring 10. The plate spring 10 can be supported, with its outside diameter, again with the interposition of a support ring 16, on the outside diameter of the membrane spring 7. The plate spring 10 can be supported, with its inside diameter, with the interposition of a support ring 17, on the clutch housing 2.

Therefore, in accordance with one embodiment of the present invention, the membrane spring 7 can be fastened such that the inner diameter of the membrane spring 7 can be supported on the intermediate diameter of the application plate 4. By means of the plate spring 10, the outside diameter of the membrane spring 7 can be indirectly supported on the clutch housing 2. The outside diameter of the plate spring 10 can be supported against the membrane spring 7 by means of the support ring 16, and the inside diameter of the plate spring 10 can be supported against the clutch housing 2, by means of the support ring 17. Such a force-dependent relationship among the plate spring 10, the support rings 16 and 17, and the clutch housing 2 together with the membrane spring 7 can provide the membrane spring 7 with its spring force characteristics whereby the membrane spring 7 can exert the application force $F_A$.

Between the outside diameter of the membrane spring 7—on the side facing away from the plate spring 10—and a component 11 fastened to the clutch housing 2, there can preferably be a mechanism 9. The mechanism 9 can make an automatic adjustment to compensate for wear to the friction linings 6, which friction linings 6 can be located on the outside circumference of the clutch disc 5. The friction linings 6 can thereby be clamped between the application plate 4 and the flywheel to transmit torque. The mechanism 9 can include a ring-shaped component 13, which ring-shaped component 13 can be oriented concentric to the axis of rotation 3. The ring-shaped component 13 can thus be rotated with respect to the membrane spring 7.

In summary, in accordance with one embodiment of the present invention, the mechanism 9 can be located between the side of the membrane spring 7 facing away from the plate spring 10 and the component 11. The mechanism 9 can include the ring-shaped component 13, which ring-shaped component 13 can be rotated with respect to the membrane spring 7 for the purpose of adjusting for the wear of the friction linings 6, thereby permitting the force $F_A$ to remain essentially constant.

Figure 2:
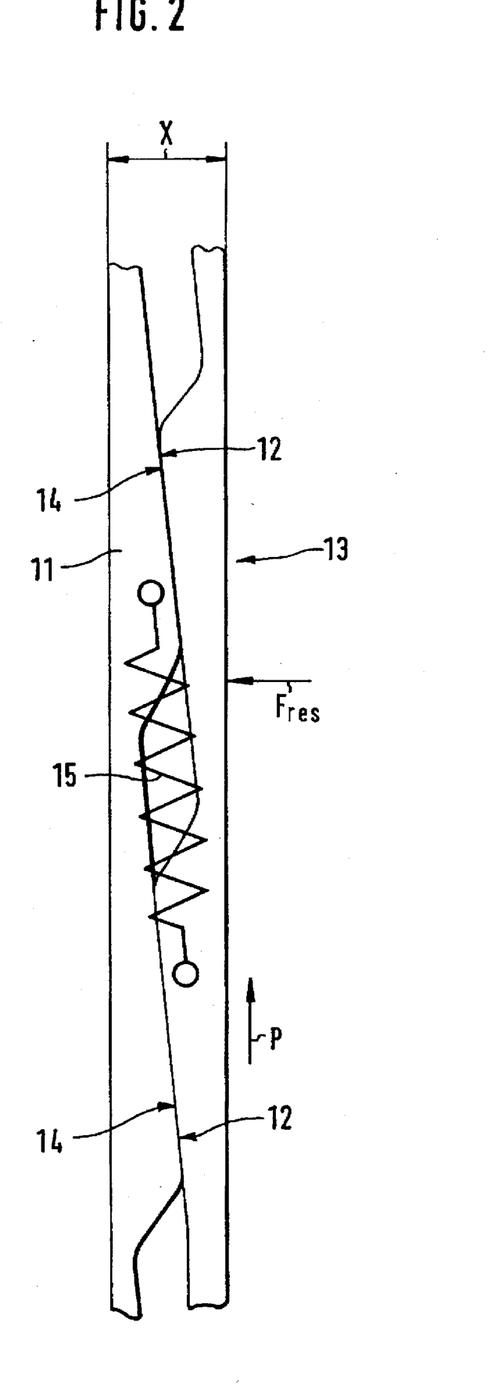
FIG. 2 shows view A, as shown in FIG. 1, of the adjustment mechanism.

The view "A", as shown in FIG. 1, is shown in detail in FIG. 2, to show the details of the system. The ring-shaped component 13 can have a number of partial surfaces 14, which partial surfaces 14 can be distributed over the circumference of the ring-shaped component 13. The partial surfaces 14 can preferably provide an ascending gradient. In addition, the partial surfaces 14 can interact with corresponding surfaces 12 located on the clutch housing 2. The opposite or corresponding surfaces 12 can thereby be located on the component 11, which component 11 can be non-detachably fastened to the clutch housing 2, as mentioned above. The ring-shaped component 13 can be spring-loaded by a spring mechanism, which spring mechanism can include, for example, several tensile springs 15. The tensile springs 15 can be distributed over the circumference of the ring-shaped component 13. The tensile springs 15 can thereby spring load the ring-shaped component 13 in the circumferential direction as indicated by the arrow P, as shown in FIG. 2.

Figure 2A:
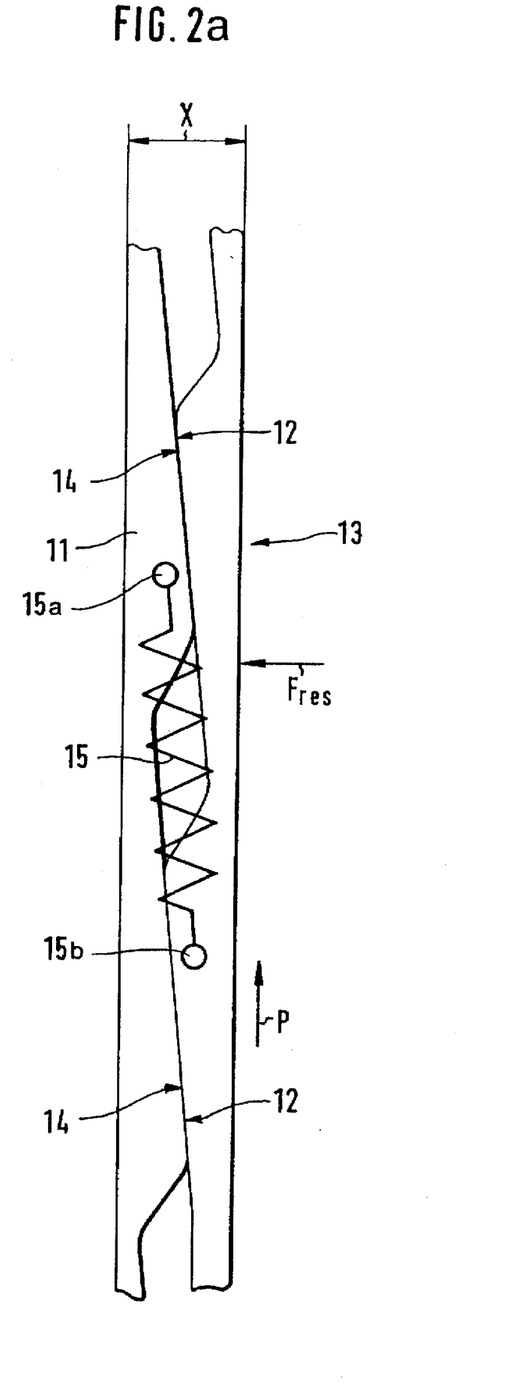
FIG. 2a shows the same view as FIG. 2, but with additional components.

In summary, in accordance with one embodiment of the present invention, as shown in view "A" of FIG. 2, the partial surfaces 14 can be located along the circumference of the ring-shaped component 13, whereas the corresponding surfaces 12 can be located on the component 11, which component 11 can be fastened to the clutch housing 2. The partial surfaces 14 can provide an ascending gradient to correspond with an ascending gradient provided by the corresponding surfaces 12. When wear of the friction linings 6 occurs, the tensile springs 15 can permit the ring-shaped component 13 to rotate in the direction of arrow P, as shown in FIG. 2. The tensile springs 15 can be connected adjacent the partial surfaces 14 and the corresponding surfaces 12, for example, to the sides of the component 11 and the ring-shaped component 13, by means of ends 15a and 15b, as shown in FIG. 2a. The tensile springs 15 can have an elastic or flexible quality, whereby, in the position of the tensile springs 15, as shown in FIG. 2, the tensile springs 15 are essentially taut. When the force $F_{res}$ on the ring-shaped component 13 is essentially reduced, however, the tension of the tensile springs 15 can, consequently, be reduced and the tensile springs 15 can relax. The partial surfaces 14 and the corresponding surfaces 12 can thereby be moved circumferentially with respect to one another to decrease the axial width of the mechanism 9 to compensate for wear of the friction linings 6.

Figure 3:
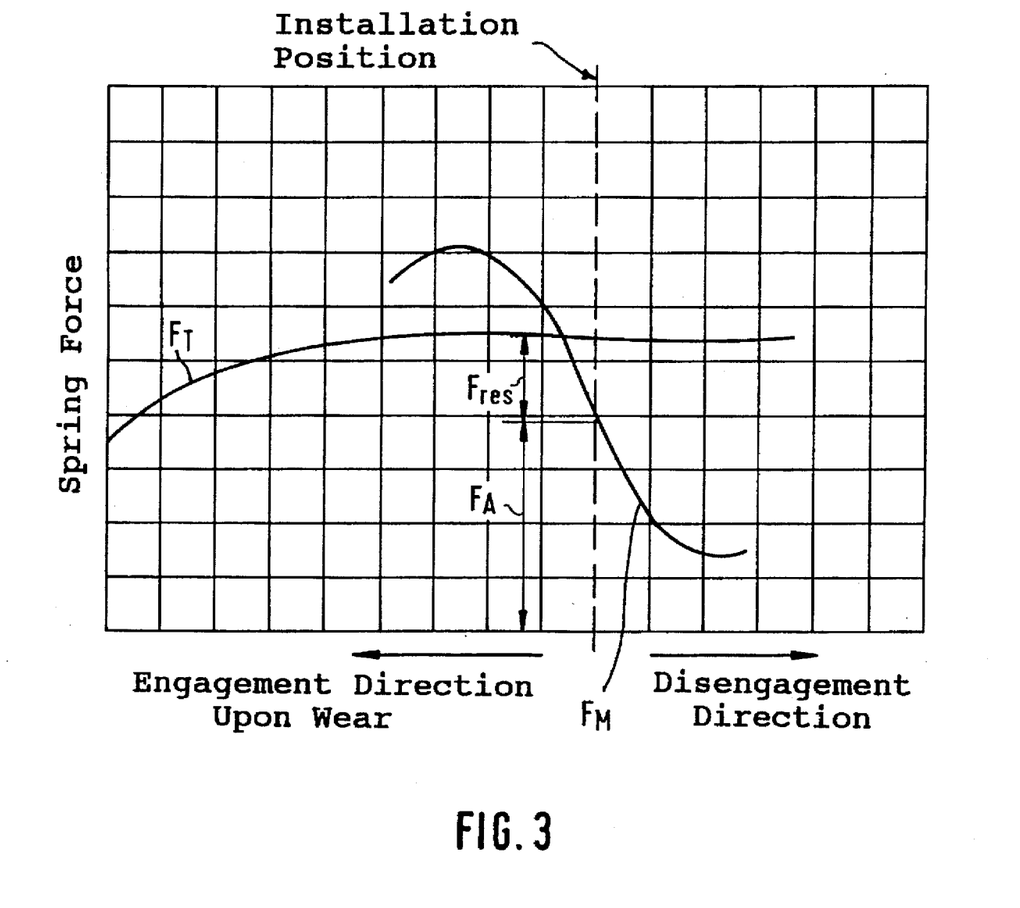
FIG. 3 shows the curve of the spring force of the plate spring and the membrane spring.

The function of the membrane spring clutch 1 is further described below with reference to FIG. 3. FIG. 3 shows the spring force curves of the membrane spring 7 and plate spring 10 as a function of the movement of the membrane spring 7. As a result of the coordination and the installation of the plate spring 10, the spring force curve $F_T$ of the plate spring 10 can be essentially very flat in the range where the wear occurs. The spring force curve $F_M$ of the membrane spring 7 can be superimposed.

The installation position, indicated by a broken line, shows that the membrane spring 7 can exert a force $F_A$ on the application plate 4 to thereby hold the clutch disc 5 in the engaged position. The membrane spring 7 can be in contact, with its outside diameter, on the support ring 16 with essentially the same force in the opposite direction. The membrane spring 7 can thereby reduce the force exerted by the plate spring 10 in the direction of the mechanism 9, so that the plate spring 10 can still act on the mechanism 9 with a force $F_{res}$. This force $F_{res}$ can be coordinated with the force of the tensile springs 15, with the ascending gradient of the partial surfaces 14 and the opposite or corresponding surfaces 12, and with the coefficient of friction between the ring-shaped component 13 and the component 11 fastened to the housing, so that in the illustrated position, a twisting of the ring-shaped component 13 by the tensile springs 15 is essentially not possible.

In summary, in accordance with an embodiment of the present invention, in the installation position of the membrane spring 7, as indicated by the broken lane in FIG. 3, the membrane spring 7 can apply the force $F_A$ on the application plate 4 to thereby engage the clutch disc 5. The force $F_A$, provided by the membrane spring 7, can also be applied to the support ring 16. The force $F_A$ can thereby essentially reduce the force $F_{res}$ of the plate spring 10 exerted on the mechanism 9. Before there is wear of the friction linings 6, however, the force $F_{res}$ exerted by the plate spring 10 against the mechanism 9 can essentially be only slightly reduced to thereby still exert the force $F_{res}$ on the mechanism 9. As a result, the tensile springs 15 can be prevented from rotating the ring-shaped component 13 with respect to the membrane spring 7, before wear of the friction linings occurs.

As shown in FIGS. 2 and 2a, there is a distance X between the area of contact of the membrane spring 7 on the ring-shaped component 13, and the component 11 which is fastened to the clutch housing 2. If, after long use, the friction linings 6 become worn, the application plate 4 can essentially travel away from the clutch housing 2 toward the flywheel. The membrane spring 7 can then begin to change its relative position in the clutch housing 2, so that the flexible tabs 8, which flexible tabs 8 can point radially inward, can travel away, in the distance indicated by the arrow $F_{Aus}$ in FIGS. 1 and 1a (the symbol which represents the disengagement system), if the wear adjustment mechanism is not present in this case, there is a relatively far distance or a relatively great displacement for the ends of the flexible tabs 8, since with a pulled membrane spring clutch, the ratio of the length of the distance between the contact point with the application plate 4 and the ends of the flexible tabs 8, to the distance between the contact point 4a on the application plate 4 and the contact point 16a on the support ring 16 is on the order of magnitude of about four to five to one.

Therefore, in accordance with one embodiment of the present invention, when wear to the friction linings 6 occurs, the mechanism 9 can essentially maintain the position of the membrane spring 7 relative to the application plate 4. The mechanism 9 can thereby prevent the wear from providing a great distance between the membrane spring 7 and the contact point 4a of the application plate 4, as shown in FIG. 1a. If the mechanism 9 were not present, the flexible tabs 8 of the membrane spring 7 would be required to travel an excessive distance of disengagement movement because, on a pulled-type clutch, there can be a ratio of length of distance of about 4 to 1 between the contact point 4a and the ends of the flexible tabs 8 to the length of distance between the contact point 4a and the contact point 16a, as shown in FIG. 1a, which contact point 16a includes the area where the membrane spring 7 can come into contact with the support ring 16. On a pulled-type clutch, the ratio of the lengths of distances can be about 4 to 1, as mentioned above. Alternatively, on a pulled-type clutch, the ratio of the lengths of distances can be about 5 to 1. Or, the ratio of the lengths of distances can be between 4 and 5 to 1. The mechanism 9 can thereby prevent an excessive disengagement movement of the flexible tabs 8, thereby permitting the membrane spring clutch 1 to require less space.

As illustrated in FIG. 3, the membrane spring 7 can be designed so that as the wear increases, i.e. when there is movement in the direction of increased wear, a sharply increasing contact force $F_A$ can be generated both on the application plate 4 and on the support ring 16. This force $F_A$, on the support ring 16, can act against the corresponding force of the plate spring 10, and this force $F_A$ can, thus, reduce the resulting force $F_{res}$ on the mechanism 9. As a result, it can become possible for the tensile springs 15 to overcome the ring-shaped component 13 in the direction of the arrow P, as shown in FIG. 2, against the friction force between the partial surfaces 14 and the matching surfaces 12 and to thereby make a corresponding adjustment. The membrane spring 7 can thereby be returned to its original installed position and the former force relationships in the vicinity of the mechanism 9 can essentially be restored. When wear occurs, it can thereby essentially be guaranteed that the membrane spring 7 can retain its original shape, and together with the radially inner ends of the flexible tabs 8, the membrane spring 7 can move toward the flywheel essentially only by the amount of the wear on the friction linings 6.

With reference t6 FIG. 3, therefore, in accordance with one embodiment of the present invention, the membrane spring 7 can be designed such that the increase in the contact force $F_A$ of the membrane spring 7 can correspond to the amount of wear on the friction linings 6. Such an increase in the contact force $F_A$ of the membrane spring 7 can be applied both on the application plate 4 and on the support ring 16. When the friction linings 6 are worn, the increased force $F_A$ of the membrane spring 7 against the support ring 16 can overcome or counteract the force $F_{res}$ of the plate spring 10 against the mechanism 9. The differential forces of the membrane spring 7 and the plate spring 10 can be used to essentially reduce the axial distance corresponding to the amount of wear. The mechanism 9 can then be free to permit the tensile springs 15 to rotate the ring-shaped component 13 in the direction of the arrow P, as shown in FIG. 2. As a result, the partial surfaces 14 and the corresponding surfaces 12 can move with respect to one another whereby the ring-shaped component 13 can correspondingly adjust to the wear, and can essentially return the membrane spring 7 to its original installation position.

In accordance with one embodiment of the present invention, the oblique surfaces 12 and 14 can include essentially smooth surfaces, for example, as discussed hereinbelow with reference to FIG. 3a', which oblique surfaces 12 and 14 could have angular values such as that discussed herebelow with reference to FIG. 3aa'. Alternatively, the oblique surfaces 12 and 14 can be other than straight or smooth surfaces. For example, the oblique surfaces 12 and 14 could include individual matching steps whereby each of the oblique surfaces 12 and 14 can be configured to include individual shoulders designed to correspond to and fit into one another, for example, as discussed hereinbelow with reference to FIG. 3b'.

In accordance with one embodiment of the present invention, when the friction linings 6 are worn, there can be a resulting disequilibrium of forces among the membrane spring 7, the plate spring 10, and the support rings 16 and 17. This disequilibrium of forces can cause the mechanism 9 to adjust for the wear, whereby the membrane spring 7 and the plate spring 10 can be adjusted to correspond to the amount of wear. As a result of the adjustment for wear by the mechanism 9, the membrane spring 7 can thus retain its original position relative to the application plate 4, such that the force $F_A$ of the membrane spring 7 on the application plate 4 can be kept essentially constant. Therefore, the disequilibrium of forces can effect the adjustment of wear by means of the mechanism 9. In addition, since this can be an essentially brief disequilibrium of forces, the force $F_A$ can be essentially constant, or uniformly high, with respect to the application plate 4.

In summary, in accordance with one embodiment of the present invention, the membrane spring clutch 1 can adjust for wear of the friction linings 6 as follows:

Before the friction linings 6 become worn, the force $F_{res}$ can be applied in the axial direction toward the ring-shaped component 13 of the mechanism 9, such that the tensile springs 15 of the ring-shaped component 13 can be prevented from being released, and the force $F_{res}$ can thereby prevent the rotation of the ring-shaped component 13. When the friction linings 6 become worn, however, the force $F_A$ applied by the membrane spring 7 can be sharply increased on the contact point 4a, where the membrane spring 7 can contact the application plate 4. Similarly, the force $F_A$ applied by the membrane spring 7 can be sharply increased on the contact point 16a, where the membrane spring 7 can contact the support ring 16. As a result, the sharply increased force $F_A$ in the direction of the support ring 16 can thereby reduce the force $F_{res}$, which force $F_{res}$ is applied by the plate spring 10 in the axial direction, with respect to the support ring 16. The sharply increased force $F_A$ can thereby essentially reduce the force $F_{res}$ applied by the plate spring 10 onto the mechanism 9. The tensile springs 15 of the ring-shaped component 13 of the mechanism 9 can thus be free to rotate the ring-shaped component 13 with respect to the membrane spring 7. The tensile springs 15, as shown in FIG. 2, can be located with respect to the ring-shaped component 13 such that, when released, the spring force of the tensile springs 15 can essentially rotate the two rings of the ring-shaped component 13 against one another. The axial distance or width of the ring-shaped component 13 can thereby be reduced to compensate for wear of the friction linings 6. The spring force characteristics and the relative position of the membrane spring 7 can thus be essentially returned to the original installation position whereby the membrane spring 7 no longer requires an excessive disengagement movement even though the friction linings 6 are worn.

It should also be noted that the clutch described above can be installed on essentially any type of flywheel, for example, a conventional flywheel or a flywheel with two centrifugal masses.

It may also be possible, in accordance with one embodiment of the present invention, that the membrane spring 7 can have different or opposite spring force characteristics such that the sharply increased force $F_A$ can be applied essentially directly onto the mechanism 9 upon wear of the friction linings 6. The mechanism 9 could thus be designed such that the sharply increased force $F_A$ on the mechanism 9 could permit the mechanism 9 to compensate for wear in a manner other than discussed hereabove.

One feature of the invention resides broadly in the friction clutch for an internal combustion engine, comprising a clutch housing which is fastened to a flywheel which has a friction surface, and which rotates with the flywheel around an axis of rotation, an application plate which is mounted in the clutch housing non-rotationally but so that it can move axially, a clutch plate between the application plate and flywheel with friction linings; a membrane spring to generate the application force, which is braced with its outside diameter on the clutch housing, and with an intermediate diameter on the application plate, and which has flexible tabs pointing radially inward for the engagement of a disengagement system; a mechanism to make an automatic adjustment for wear of the friction linings, characterized by the fact that the membrane spring 7 is supported on the clutch housing 2 on the side facing away from the application plate 4 by means of a plate spring 10 realized in the form of an abutment, and the mechanism 9 is located in the same diameter area on the side facing the application plate 4 between the membrane spring 7 and a component 11 which is permanently fastened to the housing, whereby the mechanism 9 performs the adjustment for wear by a force-dependent adjustment or by retaining the installed position of the membrane spring, such that its load pressures or tracking forces increase as wear occurs.

Another feature of the invention resides broadly in the membrane spring clutch characterized by the fact that the mechanism 9 consists of at least one ring-shaped component 13 which is oriented concentric to the axis of rotation 3, and which has, on the circumference, partial surfaces 14 which create an ascending gradient, which partial surfaces 14 interact with corresponding matching surfaces 12 on the component 11 which is fastened to the housing, whereby a spring device tensile springs 15 applies a load to the component 11 toward the clutch housing 2 in the sense of reducing the axial distance X.

Yet another feature of the invention resides broadly in the membrane spring clutch characterized by the fact that the component 11 is pressurized by the differential force $F_{res}$ of the plate spring 10 and membrane spring 7 in the direction of the reduction of the axial distance X.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

Types of clutch assemblies which have wear sensors or adjustment mechanisms for detecting and adjusting for the wear of the friction linings of a clutch may be disclosed by the following United States patents: U.S. Pat. No. 4,191,285 to Thelander et al. on Mar. 4, 1980, entitled "Wear Compensator for Belleville Spring Clutch"; U.S. Pat. No. 5,238,093 to Campbell on Aug. 24, 1993, entitled "Wear Indicator for Adjustable Clutch"; U.S. Pat. No. 4,953,680 to Flotow on Sep. 4, 1990, entitled "Clutch Adjuster"; U.S. Pat. No. 4,549,643 to Flotow et al. on Oct. 29, 1985, entitled "Self Adjusting Device for a Friction Clutch"; U.S. Pat. No. 4,310,086 to Mochida on Jan. 12, 1982, entitled "Automatic Adjusting Device for a Clutch Operating Mechanism"; and U.S. Pat. No. 4,285,424 to Sink et al. on Aug. 25, 1981, entitled "Locking Device for a Friction Type Clutch".

Types of manual transmissions in which the present invention may be incorporated may be disclosed by the following United States patents: U.S. Pat. No. 5,036,721 to Gugin on Aug. 6, 1991, entitled "Shift Control Mechanism for a Manual Transmission"; U.S. Pat. No. 4,222,283 to Nagy on Sep. 16, 1980, entitled "Manual Transmission Lubrication System"; U.S. Pat. No. 3,858,460 to Porter et al. on Jan. 7, 1975, entitled "Four Speed Manual Transmission and Control"; and U.S. Pat. No. 5,269,400 to Fogelberg on Dec. 14, 1993, entitled "Transmission Synchronizer".

Types of clutch assemblies in which the present invention may be incorporated may be disclosed by the following United States patents: U.S. Pat. No. 4,635,780 to Wiggen on Jan. 13, 1987, entitled "Clutch Disc for a Motor Vehicle Friction Clutch"; U.S. Pat. No. 4,684,007 to Maucher on Aug. 4, 1987, entitled "Clutch Plate"; U.S. Pat. No. 4,433,771 to Caray on Feb. 28, 1984, entitled "Torsion Ramping Device for a Clutch Plate"; and U.S. Pat. No. 4,099,604 to Higgerson on Jul. 11, 1978, entitled "Friction Clutch with Integral Adjuster".

The corresponding foreign patent publication applications, namely, Federal Republic of Germany Patent Application No. P 44 36 110.6, filed on Oct. 10, 1994, having inventors Reinhold Weidinger and Jörg Sudau, and DE-OS P 44 36 110.6 and DE-PS P 44 36 110.6, as well as their published equivalents, are hereby incorporated by reference as if set forth in their entirety herein.

Examples of membrane spring clutches having components that may be utilized in accordance with the embodiments of the present invention, may be found in U.S. Pat. No. 5,377,803, as well as Federal Republic of Germany Patent No. DE 43 06 688 corresponding thereto.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle with automatic compensation for wear, said friction clutch comprising:
    a clutch housing;
    a clutch disc for being disposed on a transmission input shaft having a longitudinal axis, said clutch disc being axially movable along the transmission input shaft;
    pressure plate means for engaging and disengaging said clutch disc with a flywheel, said pressure plate means being axially movable along the transmission input shaft;
    said clutch disc comprising:
        friction lining means disposed between said pressure plate means and the flywheel for contacting the flywheel and said pressure plate means upon engagement of said clutch disc;
    membrane spring means disposed between said clutch housing and said pressure plate means for applying pressure to said pressure plate means and for biasing said pressure plate means towards the flywheel;
    wear compensation means;
    means for operatively connecting said wear compensation means to a first portion of said clutch housing;
    means for supporting said membrane spring means on a second portion of said clutch housing;
    said means for supporting said membrane spring means being disposed substantially between said membrane spring means and said second portion of said clutch housing;
    said wear compensation means being disposed substantially between said membrane spring means and said means for operatively connecting said wear compensation means to said first portion of said clutch housing;
    said longitudinal axis of said transmission output shaft defining a first axial direction and a second axial direction, said first axial direction and said second axial direction being parallel to said longitudinal axis;
    said means for supporting said membrane spring means comprising a plate spring;
    said plate spring comprising means for applying a force in said first axial direction, with respect to said clutch housing;
    said plate spring comprising means for applying a force in said second axial direction with respect to said membrane spring means;
    said membrane spring means comprising means for applying a force in said first axial direction, with respect to said plate spring;
    said membrane spring means comprising means for applying a force in said second axial directions with respect to said pressure plate means;
    said means for applying a force in said first axial direction and said means for applying a force in said second axial direction of said plate spring, together with said means for applying a force in said first axial direction and said means for applying a force in said second axial direction of said membrane spring means, comprising means for prestressing said membrane spring means and said plate spring with respect to one another;
    said means for prestressing said membrane spring and said plate spring with respect to one another being disposed at a first radial distance with respect to said longitudinal axis;
    said wear compensation means being disposed at a second radial distance with respect to said longitudinal axis; and
    said first radial distance of said prestressing means being substantially equal to said second radial distance of said wear compensation means.

2. The friction clutch according to claim 1, wherein said means for operatively connecting said wear compensation means to said first portion of said clutch housing is non-detachably fastened to said clutch housing.

3. The friction clutch according to claim 2, wherein said means for prestressing said membrane spring means and said plate spring with respect to one another comprises means for adjusting said wear compensation means.

4. The friction clutch according to claim 3, wherein said means for adjusting said wear compensation means for providing an adjustment for wear of said friction lining means.

5. The friction clutch according to claim 4, wherein said adjustment for wear comprising means for positioning said membrane spring means to an original installation position with respect to said pressure plate means.

6. The friction clutch according to claim 5, wherein said adjustment for wear further comprising means for increasing the force of said membrane spring means upon wear of said friction lining means.

7. Friction clutch for an internal combustion engine, comprising:

a clutch housing;

a flywheel;

said flywheel comprising a friction surface;

said clutch housing being fastened to said flywheel;

said clutch housing being rotatable with said flywheel around an axis of rotation;

an application plate;

said application plate being mounted in said clutch housing non-rotationally but so that it can move axially;

a clutch plate disposed between said application plate and said flywheel with friction linings;

a membrane spring disposed to generate an application force;

said membrane spring being braced with an outside diameter on the clutch housing, and with an intermediate diameter on said application plate;

said membrane spring comprising flexible tabs pointing radially inward for the engagement of a disengagement system;

said membrane spring having a first side and a second side;

said first side of said membrane spring being disposed to face said application plate;

said second side of said membrane spring being disposed axially opposite said first side of said membrane spring;

said membrane spring having an outer circumferential portion;

a mechanism for making an automatic adjustment for wear of said friction linings;

a plate spring;

said plate spring being supported by said clutch housing for preventing substantial axial movement of said plate spring away from said application plate;

said second side of said outer circumferential portion of said membrane spring being supported by said plate spring at a first radial distance;

said first side of said outer circumferential portion of said membrane spring being supported by said mechanism at a second radial distance;

the first radial distance being substantially the same as the second radial distance;

a component permanently fastened to said clutch housing;

said mechanism being disposed between said component and said membrane spring;

said wear adjustment mechanism performing an adjustment for wear by a force-dependent adjustment or by retaining the installed position of the membrane spring, such that its load pressures increase as wear occurs; and said mechanism comprises at least one ring-shaped component being oriented concentric to the axis of rotation, and having, on the circumference, partial surfaces creating an ascending gradient, said partial surfaces interacting with corresponding matching surfaces on said component permanently fastened to said clutch housing;

said component permanently fastened to said clutch housing and said at least one ring-shaped component being disposed to together have a width dimension;

the width dimension being substantially parallel to the axis of rotation; and a spring device being disposed to apply a load to said component permanently fastened to said clutch housing towards said clutch housing to reduce the width dimension.

8. Membrane spring clutch according to claim 7, wherein said component permanently fastened to said clutch housing is pressurized by the differential force of said plate spring and said membrane spring in the direction of the reduction of the width dimension.

* * * * *

UNITED STATES PATENT AND TRADEMARK OFFICE
CERTIFICATE OF CORRECTION

PATENT NO. : 5,667,049
DATED : September 16, 1997
INVENTOR(S) : Reinhold WEIDINGER and Jörg SUDAU It is certified that error appears in the above-identified patent and that said Letters Patent is hereby corrected as shown below:

In column 5, line 34, after 'broken', delete "lane" and insert --line--.

In column 6, line 47, after 'reference', delete "t6" and insert --to--.

In column 10, line 36, Claim 1, after 'axial', delete "directions" and insert --direction,--.

Signed and Sealed this

Thirteenth Day of January, 1998

Attest:

Attesting Officer

BRUCE LEHMAN
Commissioner of Patents and Trademarks